United States Patent
Liu et al.

(10) Patent No.: US 11,427,914 B2
(45) Date of Patent: Aug. 30, 2022

(54) LITHIUM CELL ELECTRODE USING SURFACE-MODIFIED COPPER FOIL CURRENT COLLECTOR

(71) Applicant: GM GLOBAL TECHNOLOGY OPERATIONS LLC, Detroit, MI (US)

(72) Inventors: Haijing Liu, Shanghai (CN); Zhiqiang Yu, Shanghai (CN); Xiaochao Que, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 16/783,240

(22) Filed: Feb. 6, 2020

(65) Prior Publication Data
US 2020/0173028 A1    Jun. 4, 2020

Related U.S. Application Data

(62) Division of application No. 15/471,029, filed on Mar. 28, 2017, now Pat. No. 10,597,783.

(51) Int. Cl.
*H01M 4/66* (2006.01)
*C23C 18/12* (2006.01)
(Continued)

(52) U.S. Cl.
CPC ...... *C23C 18/1295* (2013.01); *C23C 18/1208* (2013.01); *C23C 18/1279* (2013.01);
(Continued)

(58) Field of Classification Search
CPC ............ C23C 18/1208; C23C 18/1279; C23C 18/1295; C23C 22/00; H01M 4/0404; H01M 4/661; Y02E 60/10; Y02E 60/122
See application file for complete search history.

(56) References Cited

U.S. PATENT DOCUMENTS

| 4,642,161 A | 2/1987 | Akahoshi et al. |
| 5,382,333 A | 1/1995 | Ando et al. |

(Continued)

FOREIGN PATENT DOCUMENTS

| CA | 2301585 A1 * | 11/1999 | ............ H01M 4/622 |
| CN | 102231435 A | 11/2011 | |

(Continued)

OTHER PUBLICATIONS

Scientific Technical Information Center (STIC) / EICSearch by Sam Darwish, Jul. 27, 2018 (Year: 2018).

(Continued)

*Primary Examiner* — Victoria H Lynch
(74) *Attorney, Agent, or Firm* — Harness, Dickey & Pierce, P.L.C.

(57) ABSTRACT

A copper foil, intended for use as a current collector in a lithium-containing electrode for a lithium-based electrochemical cell, is subjected to a series of chemical oxidation and reduction processing steps to form a field of integral copper wires extending outwardly from the surfaces of the current collector (and from the copper content of the foil) to be coated with a resin-bonded porous layer of particles of active electrode material. The copper wires serve to anchor thicker layers of porous electrode material and enhance liquid electrolyte contact with the electrode particles and the current collector to improve the energy output of the cell and its useful life.

15 Claims, 2 Drawing Sheets

(51) Int. Cl.
*H01M 4/04* (2006.01)
*C23C 22/00* (2006.01)

(52) U.S. Cl.
CPC ........... *C23C 22/00* (2013.01); *H01M 4/0404* (2013.01); *H01M 4/661* (2013.01); *Y02E 60/10* (2013.01)

(56) References Cited

U.S. PATENT DOCUMENTS

| | | | |
|---|---|---|---|
| 5,919,589 | A | 7/1999 | Kawakami et al. |
| 6,475,680 | B1 | 11/2002 | Arai et al. |
| 2005/0064291 | A1* | 3/2005 | Sato ...................... H01M 4/386 429/231.95 |
| 2006/0147800 | A1* | 7/2006 | Sato ...................... H01M 4/134 429/231.95 |
| 2009/0316335 | A1* | 12/2009 | Simon ................... H01M 4/134 429/188 |
| 2014/0234681 | A1* | 8/2014 | Kwon ..................... H01M 4/02 429/94 |

FOREIGN PATENT DOCUMENTS

| | | |
|---|---|---|
| CN | 103531817 A | 1/2014 |
| CN | 108666579 A | 10/2018 |
| DE | 102018106566 A1 | 10/2018 |
| WO | 2011094642 A1 | 8/2011 |

OTHER PUBLICATIONS

Filipic et al. (Nanotechnology 23 (2012) 194001, pp. 1-16 (Year: 2012).

First Office Action for Chinese Patent Application No. 201810198968.8 dated Nov. 3, 2020 with English language machine translation, 16 pages.

* cited by examiner

LITHIUM CELL ELECTRODE USING SURFACE-MODIFIED COPPER FOIL CURRENT COLLECTOR

CROSS-REFERENCE TO RELATED APPLICATIONS

This application is a divisional of U.S. patent application Ser. No. 15/471,029 filed on Mar. 28, 2017. The entire disclosure of the above application is incorporated herein by reference.

TECHNICAL FIELD

Copper current collector foils are often used to carry bonded porous layers of electrode particles as electrode structures in lithium-based batteries and capacitors. In accordance with this disclosure, the surfaces of the copper foil are chemically modified by the formation of integral, outwardly extending, micrometer-size copper wires with spaces or channels between them for enhancing adhesion of particulate electrode material, enhancing contact with a liquid electrolyte solution, and reducing electrical resistance between the electrode particles and the current collector.

BACKGROUND

Lithium-based battery and capacitor cells are used in many articles of manufacture. Some of the larger embodiments of these cells are used as electrical power sources in automotive vehicles and in other relatively large power-requiring consumer products. Electrodes for many lithium-ion based electrochemical cells are often formed by depositing porous layers of resin-bonded particles of active electrode material onto the opposing major surfaces of a suitable metallic current collector foil. Although portions of the foil may be curved or folded in the assembly of an electrode in a cell, the surfaces of the current collector foil, to which the electrode material is applied, are generally flat and smooth. Cells using such electrodes are often formed by stacking or rolling like-shaped, alternating, thin porous anode and cathode material layers, held apart by coextensive, thin, porous, electrically resistant polymeric separator layers, and by infiltrating the facing porous cell materials with an electrolyte solution formed of a suitable lithium salt electrolyte dissolved in a non-aqueous lithium ion conducting solvent.

During discharge of a lithium-ion battery, lithium ions are de-intercalated from a lithium-containing anode material into the surrounding electrolyte with the concurrent release of electrons into the anode current collector and then into an external DC circuit, which includes a power consuming device. Within the cell, lithium ions are transported through the electrolyte solution, through the pores of the separator, and are intercalated into particles of a lithium compound of the cathode material (also carried on a metallic current collector) as electrons enter the cathode material from the external circuit. During discharge of a lithium capacitor, the discharge of electrons occurs as adsorbed lithium ions are released from the anode material and adsorbed anions are released from the cathode material. The total energy and effectiveness of such lithium cells depends largely on the capacity of the respective electrode materials, bonded to their current collector, to interact with the electrolyte solution and to receive and release lithium ions. The energy and effectiveness of such lithium cells also depends on ability of electrons to flow from the particulate electrode materials to and from their metal current collector foil.

Anodes for lithium cells are often prepared by forming a porous resin-bonded layer of graphite particles (which can hold lithium atoms) or particles of a lithium compound, such as lithium titanate, on both major surfaces of its current collector foil. The anode current collector foil is often a copper foil. The copper foil is often formed of electrodeposited copper having a thickness in the range of about five to fifteen micrometers. The thicknesses of the adherent porous layers of particulate anode material, which are suitably bonded to the opposite surfaces of the copper foil current collector, are typically up to about 100 to 150 micrometers. The energy-producing capacity of the lithium cell is dependent on the composition, nature, thickness, and area (amount) of the coating of anode material on the flat surfaces of its copper current collector. There remains a need for improvement in the structure of the surfaces of the copper current collector and of the bonding of the porous layer(s) of particulate anode material applied to its surfaces.

SUMMARY

In accordance with practices of this disclosure, the surface or surfaces of a copper sheet or foil, intended for use as a current collector in a lithium-based electrochemical cell, are treated chemically to change the generally flat, smooth copper surface to a surface characterized by many closely spaced copper wires that are each integrally attached at one end to the remaining copper surface with an outwardly extending wire length having an upper or outer end. The wires (or like-shaped, elongated projections) extend outwardly and generally upwardly in random directions from the underlying supporting copper surface. The lengths of the copper wires may be from a few micrometers to about thirty micrometers. The diameters of the wires or projections are typically in the range of several hundred nanometers, up to a micrometer or so.

The outwardly extending copper wires are generally closely spaced (but separated) on the surface of the foil base and resemble a field of wires on the copper substrate. The wires, with the small spaces between them, provide mechanical connectors for a dry or wet slurry of irregularly-shaped, nanometer-size particles of electrode material to be applied as a thin porous layer onto the modified copper foil surfaces, flowing into the spaces or channels between the upstanding wires, and bonding to the wires and to the supporting copper foil ground spaces between the wires.

In an illustrative embodiment, a mixture of graphite particles or particles of lithium titanate with particles of conductive carbon are dispersed in a binder solution of, for example, polyvinylidene difluoride (PVDF) dissolved in N-methyl-2-pyrrolidene (NMP). Previously, the spreadable, wet particle mixture (or slurry) was simply applied and leveled onto each of the opposing flat surfaces of a copper foil to simultaneously, or sequentially, form generally uniformly thick layers of the porous anode material. The solvent is evaporated leaving a film of the polymeric binder to bond random surfaces of the somewhat-spherical, but irregularly-shaped, particles of electrode material to each other and to the smooth flat surfaces of the copper foil. In many applications, such porous layers of particulate electrode material have had thicknesses limited to about 50 μm to about 150 μm to retain suitable integrity and adherence of the porous coating to the generally flat surfaces of the copper current collector.

In accordance with practices of this disclosure, the surfaces of the copper current collector foil are treated by a series of chemical processing steps so as to form the fields of upstanding copper wires, the formed fields being co-extensive with the surface regions of the current collector foil that are to be coated with bonded particles of electrode material. There may also be regions of the foil, such as connector tabs for external electrical connections, which will remain un-coated with electrode material and which do not require the presence of the copper wires.

The initial thickness of a copper foil selected for its preparation as a current collector for a lithium-based battery or capacitor cell is generally suitably in the range of about ten micrometers to about thirty micrometers. The composition of the foil is substantially pure copper with a suitably high level of electrical conductivity for battery or capacitor cell use. It may have been prepared by conventional processing, such as by electroplating or electrodepositing onto a non-adherent, forming-surface. The surfaces of the foil are cleaned for the purposes of the following processing. Its two-dimensional shape and dimensions may, for example, be selected for the purpose of subsequently cutting a large workpiece of the surface-modified foil into rectangular strips or ribbons for forming individual predetermined electrode shapes.

The surfaces of the foil are immersed in (or otherwise suitably contacted with) an aqueous solution of ammonium persulfate ($(NH_4)_2S_2O_8$) and sodium hydroxide, suitably at ambient temperature (e.g., about 20-25° C.) for a suitable predetermined period to oxidize the copper at the surfaces of the copper foil and to form small wires or like-shaped, upstanding protrusions of copper hydroxide, $Cu(OH)_2$. The duration of the oxidation reaction may be determined experimentally so as to form a desired density of copper hydroxide wires on the surface of the copper foil, and the desired shapes of the copper hydroxide structures. At the completion of the aqueous oxidation reaction, the foil is washed with water to remove residual oxidizing material, and prepared for an annealing reaction in air.

The foil is then heated in air at a temperature of about 60° C. to about 90° C. to further oxidize the copper hydroxide protrusions on its surface to chemically change them to copper oxide, CuO, wires or protrusions. The copper oxide protrusions (formed from the existing copper hydroxide protrusions) remain with one end attached to the elemental copper substrate and with a length, greater than their diameters, extending generally upward, but at different angles from the copper surface. Following the formation of the copper oxide structures on the surface of the copper foil, they are subjected to a reduction reaction under a hydrogen atmosphere at a temperature of about 120° to 150° C. At the completion of the reduction reaction, each of the opposing major substantially flat surfaces of the original copper foil material are now characterized by a co-extensive "field" of copper wire (or wire-like) structures (formed from the copper oxide structures) having diameters and lengths. The lengths of the copper wires on each side of the original copper foil may be up to about 30 micrometers or longer, depending on the initial formation of calcium hydroxide wires. And the copper wires are spaced and angled such that there are channels or spaces between them. As will be described in more detail below in this specification, individual wires may have different angles with the remaining surfaces of the copper foil.

The application of particles of active electrode material, usually anode material, may be applied to the wire-carrying foil surfaces at different steps of the wire-forming processes of this invention. In two embodiments or illustrations, the particles of electrode material are applied in a slurry of suitable viscosity for the nature of the wire-bearing surface being coated. As stated above in this text, micrometer-size particles of active anode material (e.g., graphite or lithium titanate) and smaller particles of conductive carbon may be dispersed in a solution or dispersion of a suitable binder resin (e.g., PVDF) in a suitable solvent (e.g., NMP). The viscosity of the formed slurry is determined and managed to suitably interact with, penetrate, and coat the wire-containing surface(s) of the copper foil.

In a first embodiment of the invention, the slurry may be spread over and applied to the copper wire-containing surface(s) of the copper foil. A layer of suitable, generally uniform, thickness is applied. The solvent is removed, such as by evaporation, and the residual resin coating, dried or cured (by heating, if necessary) to form a porous layer of bonded anode particles and conductive carbon particles, anchored by the copper wires to the surface of the copper foil. As will be described in more detail, the applied particles of anode material occupy the spaces between the copper wires and with some adherence to the wires and to the copper substrate surface to improve electrical and electrochemical interaction between the particles of electrode material and their underlying current collector. And thicker layers of electrode material may be secured to the field(s) of wires formed on the surfaces of the current collector.

In a second embodiment of the invention, a like slurry of electrode material particles and conductive carbon particles may be applied to the copper oxide wires formed on the copper current collector foil. Following application and drying of the electrode material, the coated current collector is subjected to the hydrogen reduction reaction to chemically reduce the copper oxide wires or protrusions into copper wires. The diameter of the copper oxide wires will shrink during the reduction reaction. The heating of the combined materials during the reduction reaction may promote further flow of the resin-bonded particulate electrode material, enabling further filling of the channels between the copper oxide wires as they are chemically reduced in the hydrogen atmosphere, and further adherence of the electrode material to the copper wires and to the residual copper surface. Additionally, the shrinkage of the wires as oxygen is removed may leave additional channel spaces along the copper wires for increased electrolyte contact, improved ion transfer, and improved power performance.

In a third embodiment of the invention, a slurry of the electrode particles, conductive carbon particles and resin dispersion are formed and processed separately so as to form a movable integral porous layer of resin-bonded particulate electrode material. While the thickness of the layer of bonded electrode material on the prior smooth copper current collector surfaces is in the range of about fifty micrometers to one hundred fifty micrometers, the thickness of the present resin-bonded layer may be somewhat larger because it is to be placed on a foil surface covered with copper wires having lengths, for example, of up to about thirty micrometers. The layer of electrode material is suitably soft, mobile, and pliable so as to be easily penetrated by the copper wires extending upwardly from the surface(s) of the current collector. The movable layer of electrode material is then placed over each copper wire-bearing surface of the current collector and suitably pressed against the upstanding wires and toward the underlying copper foil surface. The pressing is conducted so that a small micrometer-size buffer space (or a number of separate spaces) remains between portions of the applied layer of electrode material particles and the current collector surface at the bases of its field of upstanding copper wires. When the layered electrode is assembled in a lithium cell, the liquid electrolyte solution will flow into and through the pores of the particulate electrode material, filling the buffer spaces between the current collector base surface and the facing portions of the pre-formed anode material.

In each of the above three embodiments, the thickness (and amount) of the porous electrode layers may be increased by making use of the increased adhesion enabled by the bonding of the electrode material with the integral copper wires formed on the surfaces of the copper current collector. The additional electrode material can increase the energy capacity of the cell. Further, the interfacial electrical resistance between the copper current collector, with its upstanding copper wires, and the porous layer of electrode is decreased by the increased wire-containing contact area between the particulate members of the electrode. And additional contact area is provided between the liquid electrolyte and the surfaces of the wires and the base of the current collector. Each of these features increases life of the electrode and the available power which may be generated at the electrode.

Other objects and advantages of the invention will be apparent from the examples presented in the following sections of this specification.

DRAWINGS

In this example, copper hydroxide wires or protrusions are initially integrally formed on a major surface of a copper current collector foil by oxidation of the copper surface with an aqueous solution of sodium hydroxide and an oxidizing agent. In a second processing step, the copper hydroxide wires are further oxidized by annealing in air to chemically change the copper hydroxide wires to copper oxide wires. In the third step, the copper oxide wires are reduced in a hydrogen atmosphere to form a dense field of copper wires extending outwardly from the surface of the copper foil. In the fourth step, a slurry of particulate electrode materials in a liquid solution or dispersion of a binder resin is applied to copper foil with its formed field of copper wires to form an electrode body in which a porous layer of particles of electrode material are resin-bonded to each other and to the wires and underlying surface of the copper current collector foil.

DETAILED DESCRIPTION

In existing practices for forming anodes for lithium-ion batteries and for forming electrodes for other lithium-based electrochemical cells, one usually employs a thin copper foil with flat, smooth surfaces as the current collector for the anode material. Copper foils may also be used in other electrode applications when copper is compatible with the electrolyte and the electrode material in the overall function of the electrochemical cell. Copper foils formed of substantially pure, elemental, high electrical conductivity copper are often formed by an electroplating or an electro-deposition process. They have flat, generally smooth opposing surfaces and are commercially available in a range of two-dimensional area shapes and thicknesses. In many lithium-based battery and capacitor anode applications, a foil having a thickness in the range of about five micrometers to about fifteen micrometers is used. Initially the foil may have a large width and length for the application of electrode material to one or both of its opposing surfaces. Individual electrodes, sized for stacking or rolling with complementarily-shaped cathodes and porous separators, may be cut out from a larger current collector shape to which electrode material is applied. While much of the area of a copper current collector is coated (often by resin-bonding) with a porous layer of particulate active anode material, each individual electrode usually has a small un-coated tab at one side for electrical connection with other electrodes in an assembly of cell members.

As stated above, graphite particles or lithium titanate particles are examples of suitable particulate anode material for use in a lithium-ion battery cell. These and other suitable anode materials are capable of intercalating lithium from a lithium-ion conducting electrolyte during cell charging when electrons flow from the current collector into the anode material. And the anode materials are capable of de-intercalating lithium ions into the electrolyte and delivering electrons into the underlying current collector during cell discharge to an external power-using circuit load. In most prior lithium-based cell products, the thickness of the porous resin-bonded particulate active anode layers was limited to about one hundred to about one hundred fifty micrometers, based on the adherence of the bonded particulate anode layers to the flat surfaces of the copper current collectors.

It is an object and purpose of this disclosure and invention to modify the otherwise flat surfaces of a copper foil intended for use as a current collector in an electrode for a lithium-ion battery or other lithium-based battery or capacitor cell. Intended electrode material-bearing surfaces of the foil are treated by a multi-step chemical process to convert elemental copper at a selected area of the foil surface to many integrally attached upstanding copper wires or like-shaped, relatively, long, thin projections of conductive elemental copper. The copper wires are typically several hundred nanometers to a micrometer or so in diameter and up to about thirty micrometers in length. As will be seen, these upstanding copper wires serve as an extended field of many small anchoring structures for surrounding resin-bonded particles in the porous layer of electrode material. In many instances, a thicker layer of resin-bonded particulate electrode material may be applied and adhered to the foil surface with its field of copper wires than may be suitably applied to a foil with a smooth surface. And the field of copper wires, each secured at one end to, and integral with, the surface of a copper foil current collector provides many additional electrical connections between the electrode particles, the electrolyte, and the remaining underlying copper current collector surface.

Figure 1A:
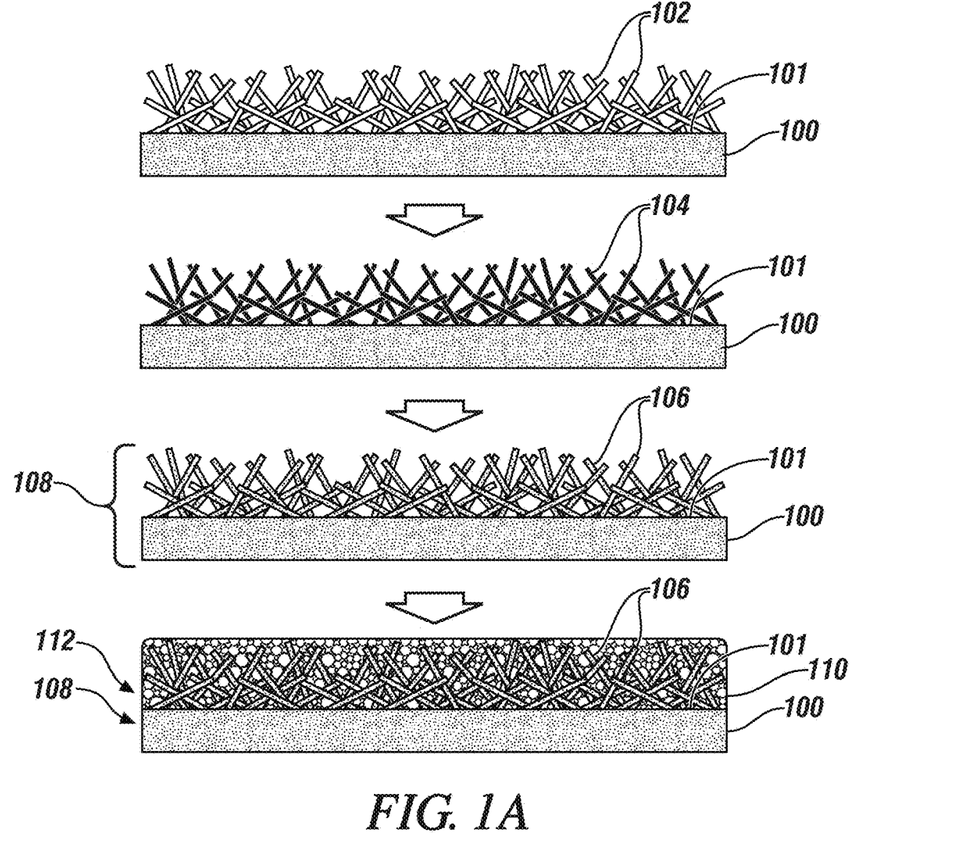
FIG. 1A is a schematic, enlarged, side or edge-view illustration of the results of a first example of three progressive processing steps by which the surface of a copper current collector foil is modified to have a field of copper wires integrally bonded to the surface of the current collector. In a fourth step a porous layer of particulate current collector material is applied to the field of copper wires and their supporting copper surface. In this example and the following examples, the practices of the methods of this disclosure are illustrated, for reasons of simplicity and space-saving, as being applied to the upper surface of a copper current collector foil. But both opposing surfaces of the copper current collector foil can be treated, simultaneously or sequentially, in the same manner.

FIG. 1A is a schematic, enlarged, edge-view illustration of the progressive results of a first example of four progressive processing steps by which a porous layer of particulate anode material 110 is applied to a copper current collector foil 100 having a field of copper wires 106 integrally bonded to a surface 101 of the current collector 100. In this example and the following examples, the practices of the methods of this disclosure are illustrated as being applied to the upper surface 101 of an illustrated copper current collector foil 100. But, in general practice, both opposing surfaces of the copper current collector foil would be treated, simultaneously or sequentially, in the same manner.

In this example of FIG. 1A, in the upper illustration, copper hydroxide wires 102 or protrusions are initially integrally formed on a major surface 101 of a copper current collector foil 100 by oxidation of the copper surface with an aqueous solution of an oxidizing agent and a hydroxide compound. An aqueous solution of ammonium persulfate ($(NH_4)_2S_2O_8$) and sodium hydroxide (NaOH) is used as an example of a suitable oxidant/hydroxide solution for the surface of a copper foil. Ammonium persulfate is a preferred oxidant. Hydrogen peroxide and potassium permanganate ($KMnO_4$) are other potential oxidants. The selected oxidant reacts with the copper surface, etching it and producing copper ions which react with sodium hydroxide (or other alkali metal hydroxide) to form many copper hydroxide wire-like projections on the modified surface(s) of the copper foil.

The reaction is: $Cu+4NaOH+(NH_4)_2S_2O_8=Cu(OH)_2+2Na_2SO_4+2NH_3+2H_2O$.

In the following examples, the concentration of sodium hydroxide was suitably 2.5 M and the concentration of ammonium persulfate was varied from 0.02 M to 0.12 M.

The aqueous solution is applied to the full surface or surfaces of a copper foil workpiece at an ambient room temperature for a determined reaction period of about two hours. If desired, selected areas of the copper foil may be masked, for example, to leave tab portions or other selected portions with un-modified surfaces. As summarized in the above chemical reaction equation, the solution reacts with the surface 101 of the copper foil 100, copper is progressively oxidized and re-formed or re-deposited as wire-like projections 102 of copper hydroxide as illustrated schematically (and not necessarily to dimensional scale) in the first (upper) of the four processing steps illustrated in FIG. 1A. The oxidation and re-precipitation reaction occurs such that the wire-like protrusions 102 or projections are grown from the surrounding copper surface 101 of the copper foil 100 and extend outwardly in somewhat random directions. Over a period of minutes up to a few hours, as determined by experience or experiment, a field of closely spaced copper hydroxide wires 102 is thus grown over the surface areas 101 of the foil 100 that are exposed to the aqueous alkaline oxidizing solution.

The morphology of the copper protrusions was found to depend on the concentration of the oxidant and hydroxide ion constituent in the aqueous solution, and the lengths of the wires depended on the length of the reaction period. A suitable quantity of hydroxide ions is required. The following examples were conducted at room temperature (about 20° C. to 25° C.) without heating the copper foil or the oxidizing solution. In the following examples, the concentration of the sodium hydroxide in the aqueous solution was 2.5 M (Molar) and the concentration of the ammonium persulfate was varied. The reaction time was two hours in each example.

When the concentration of ammonium persulfate in the aqueous solution was 0.02 M, a small amount of copper hydroxide sprout-like nanostructures were formed. When the concentration of ammonium persulfate was 0.04 M, copper hydroxide nanowires were formed and shaped. When the concentration of ammonium persulfate was increased to 0.08 M, copper hydroxide nanowires with needle-like tips were formed. And when the concentration of ammonium persulfate was increased to 0.12 M, copper hydroxide nanotubes were formed. In general, it is observed that when the reaction period is increased, using a specific composition of ammonium persulfate, the lengths of the formed copper hydroxide wires was increased. During the two-hour reaction period, the lengths of the formed copper hydroxide wires were in the range of ten to twenty micrometers. The diameters of the copper hydroxide wires or nanotubes were often in the range of about 400 nm to about 1000 nm. Depending on the concentration of the oxidant, in many embodiments, a suitable reaction time will be in the range of about 0.5 to about 5 hours. And, of course, in some embodiments, it may be helpful to adjust the temperature at which the oxidation reaction is conducted for the formation of the field of copper hydroxide wires on selected surface(s) of a selected copper foil. In general, copper hydroxide wires (and ultimately copper wires) have lengths from a few micrometers to about thirty micrometers are readily formed on the otherwise flat surfaces of a copper foil workpiece. Preferably the original thickness of the copper foil is in the range of about ten to thirty micrometers.

Thus, the copper hydroxide wires 102 may be grown over the field surface 101 of the copper foil 100 and extending to general lengths of a few micrometers to about thirty micrometers. Since the growth directions of the copper hydroxide wires is somewhat random, the resulting general height of the field may be somewhat less. Thus, the general height of the field of copper hydroxide wires 102 may approach or exceed the thickness of the copper foil 100 to which they are attached, and which supports them.

A like field of copper hydroxide wires may be grown on both surfaces of the copper foil. And the thickness of the original copper foil must provide for the copper converted into the copper hydroxide wires. The copper hydroxide wires are precursors for the copper wires, ultimately to be formed. At the completion of the first processing step, the copper foil 100 with its field of copper hydroxide wires 102 is washed with water to remove any remaining reactants and un-wanted byproducts. The modified foil may then optionally be dried in preparation for the next processing step.

The result of the second processing step is illustrated in the second-stage of the schematic illustration of FIG. 1A. The copper hydroxide wires are further oxidized by annealing in air at a temperature in the range of 60° C. to 90° C., typically over a period of two to five hours, to form somewhat thinner copper oxide wires 104, still integrally attached to the underlying copper surface 101 of the copper foil 100. It is the goal of this second oxidizing step to carefully convert the copper hydroxide wires 102 to somewhat thinner copper oxide wires 104 without reducing the number of wires in the initial field and with minimal effect on the surface 101 of the underlying copper foil substrate 100.

In the third processing step, the copper oxide wires 104 are reduced in a reaction furnace or vessel with a hydrogen gas atmosphere to form a dense field of thin copper wires 106 extending outwardly from the surface 101 of the copper foil 100. The resulting formation of the copper wires 106 is illustrated schematically in the third-stage illustration of FIG. 1A. The temperature of this reduction reaction may be conducted at a temperature in the range of 120° C. to 150° C., for example, for a period of about twenty to sixty minutes. The chemical reduction of the copper oxide wires to copper wires results in some further thinning of the diameters of the wire-like projections on the surface(s) of the copper foil. The modified current collector foil 108 is now ready for the application of a porous coating layer of resin-bonded particles of anode material, such as graphite or lithium titanate, to the modified surfaces of the copper current collector foil. As stated, the general level of extension of the field(s) of copper wires 106 above the remaining copper surface 101 of the intended current collector may be in the range of a few micrometers up to about thirty micrometers or so. In the event that the modified copper foil 108 is to be moved to a different location for the application of the electrode coating, it may be prudent to protect the modified copper wire-bearing surfaces of the foil bodies.

As will be described, the application of the electrode material to the wire-modified current collector foil 108 may be accomplished by different processes.

The result of a first application process is schematically indicated at the fourth stage (lowest illustration) of the illustrations of FIG. 1A. In the first such process, a slurry of particulate electrode materials in a solution or dispersion of a binder resin is applied to copper foil 100 with its formed field of copper wires 106. After evaporation of the solvent and drying or curing of the resin, an electrode body 112 is formed in which a porous layer of resin-bonded particles of electrode material 110 is bonded to the wires 106 and underlying surface 101 of the copper current collector foil 100. Depending upon their formed lengths, the copper wires 106 may extend several micrometers into the resin-bonded particles of electrode material 110.

Figure 1B:
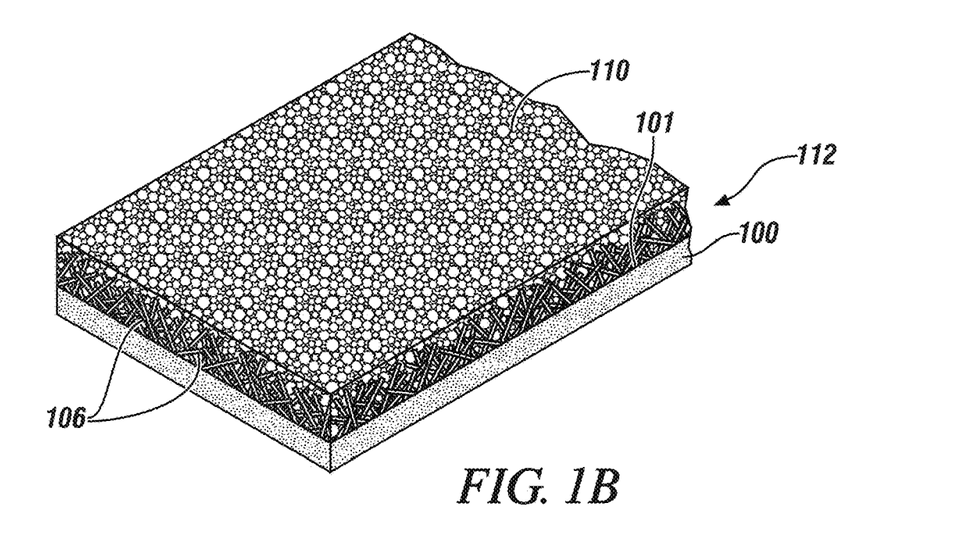
FIG. 1B is an oblique schematic view of a portion of the formed electrode of FIG. 1A, showing the porous layer of particles of electrode material which are formed around the copper wires extending from the underlying surface of the copper current collector.

FIG. 1B is an oblique schematic view of a portion of the formed electrode 112 of FIG. 1A, showing the porous layer of particles of electrode material 110 which are formed around the copper wires 106 extending from the underlying surface 101 of the copper current collector 100.

Figure 2:
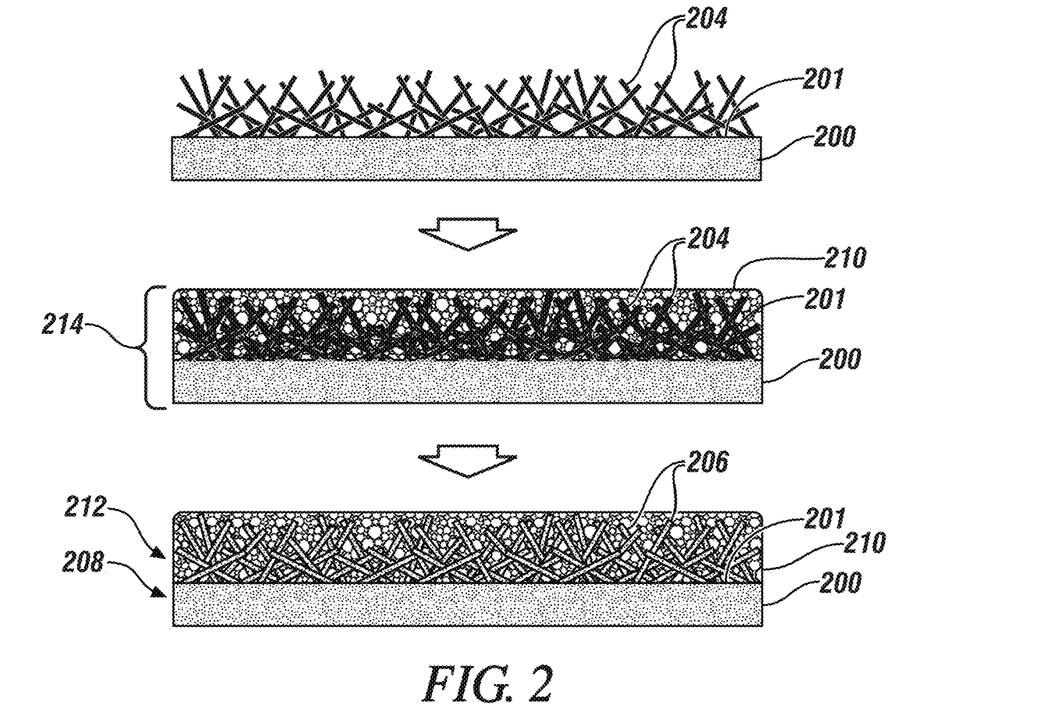
FIG. 2 is a schematic enlarged edge-view illustration of the results of a second example of progressive chemical processing steps by which a porous layer of particulate anode material is applied to a copper current collector foil having a field of upwardly standing copper wires integrally bonded to the surface of the current collector. In this example, copper hydroxide wires or protrusions are initially integrally formed on a major surface of a copper current collector foil by oxidation of the copper surface with an aqueous solution of sodium hydroxide and an oxidizing agent. The copper hydroxide wires are further oxidized by annealing in air to chemically change them to copper oxide wires. Then, in contrast to the example of FIG. 1A, a slurry of particulate electrode materials in a solution or dispersion of a binder resin is applied to copper foil with its formed field of copper oxide wires to form a precursor electrode body in which a porous layer of particles of electrode material is bonded to the copper oxide wires and underlying surface of the copper current collector foil. Following the forming of the resin-bonded electrode layer around the copper oxide wires, the copper oxide wires, immersed in the coating of porous electrode material, are chemically reduced in a hydrogen atmosphere to convert them to a dense field of copper wires extending outwardly from the surface of the copper foil. Thus, in the final illustrated processing stage of FIG. 2, the coating of resin-bonded electrode material is bonded to electrically conductive copper wires and to the residual surface of the copper current collector foil.

A second embodiment of the invention is illustrated in FIG. 2 in which a porous layer of particulate electrode material and conductive carbon particles are suitably added as a mixture in a liquid slurry to a modified copper current collector foil at a different stage of the surface modification process than was practiced in the embodiment illustrated in FIG. 1. In accordance with this second embodiment, a field of copper hydroxide wires is initially formed on the surface(s) of a copper current collector foil by the oxidation process using an aqueous solution of ammonium persulfate and sodium hydroxide as described above in this specification. The surface of the copper foil with its field of copper hydroxide wires would be as illustrated in the first stage of FIG. 1A. The field of copper hydroxide wires was then further oxidized to copper oxide wires 204 upstanding from surface 201 of foil 200 by annealing in air as described with respect to the second processing step described with respect to FIG. 1A. The copper foil 200 with its field of copper oxide wires 204 upwardly standing from its surface 201 is illustrated in the first processing stage of FIG. 2.

As illustrated in FIG. 2, a copper foil 200 with an integral field of copper oxide wires 204 is used as the modified-surface copper foil for application of the active electrode material. A slurry of particulate electrode materials in a solution or dispersion of a binder resin is applied to copper foil 200 onto its formed field of copper oxide wires 204. For example, the slurry may comprise a mixture of graphite particles and conductive carbon particles, dispersed with a resin and a liquid solvent or dispersing medium as described above in this text. The slurry is applied to the copper current collector foil 200 with its field of upstanding copper oxide wires 204 such that the dispersion fully infiltrates the spaces and channels between the wires and contacts the residual surface 201 of the copper foil 200. After the solvent is removed and the resin cured or dried, a porous layer of resin-bonded particulate electrode material 210 is bonded to the copper oxide wires 204 and to the surface 201 of the copper foil 200. The copper oxide wires 204 extend into the layer of bonded particulate electrode material 210. This combination of a resin-bonded electrode material layer 210 with the copper oxide wire-modified copper foil is a precursor electrode structure 214.

The electrode material-coated copper foil 214 is then placed in a reaction vessel with a hydrogen atmosphere at a temperature of 120-150° C. to chemically reduce the copper oxide wires 204 to copper wires 206. This reaction often requires about twenty to sixty minutes. The hydrogen gas permeates the pores between the particles of the electrode material 210 to accomplish the reduction reaction. The increased temperature of the hydrogen gas reductant also enables some flow of the resin-bonded material, promoting adherence to the copper wires 206. The electrode structure 212 consisting of the porous electrode material 210 bonded to the upwardly standing copper wires 206 and the residual copper surface 201 of the copper foil 200 is illustrated in the third stage of FIG. 2.

Again, the final modified copper foil structure 208, with its field(s) of copper wires, provides more contacting surface area for the porous resin-bonded particles of anode material and conductive carbon particles. The additional bonding structures and surfaces provided by the integral copper wires 206, upstanding on the surface 201 of the copper foil 200, increase the adhesion between the electrode material and the surface-modified current collector. And a subsequently applied and infiltrated electrolyte solution has more contact surfaces with both the additional copper wire-modified surface of the copper current collector and the porous layer of particulate anode material.

Figure 3:
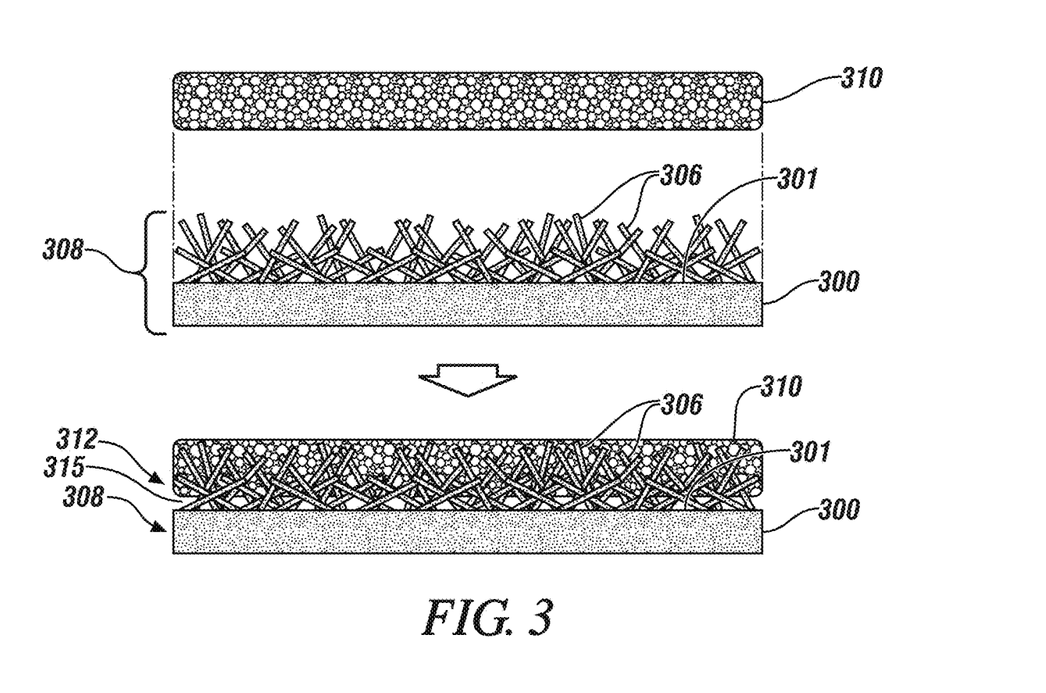
FIG. 3 is a schematic, enlarged, edge-view illustration of the results of a third example of progressive processing steps by which a porous layer of particulate anode material is applied to a copper current collector foil having a field of copper wires integrally bonded to the surface of the current collector. In this third example, the illustrated upper surface has been treated using the first three steps of the processing sequence of the FIG. 1A illustration to form a field of upstanding elemental copper wires integrally bonded to the upper surface of the current collector foil. A thin pliable, porous layer of resin-bonded particles of electrode material is separately prepared. The prepared layer of electrode material is then pressed onto the surface of the current collector foil with its formed field of upstanding copper wires. The electrode material is pressed onto the copper wires so as to leave one or more buffer spaces between the layer of electrode material and the surface of the copper foil at the bases of its integrally formed copper wires.

A third method for applying a layer of resin-bonded electrode particles to the surface-modified copper current collector foil is illustrated schematically in FIG. 3. In this third embodiment, the illustrated upper surface 301 of the copper foil 300 has been treated, using the first three steps of the processing sequence described in connection with the illustrations of FIG. 1, to form a field of elemental copper wires 306, each integrally bonded at one end to the upper surface 301 of the current collector foil 300. As stated above in this specification, in many applications both major surfaces of current collector foil 300 would be chemically treated to contain like fields of the copper wires 306 in the surface-modified copper foil structure 308.

In this embodiment, a thin pliable, self-standing porous layer of resin-bonded particles of electrode material 310 (as illustrated schematically in FIG. 3) is separately prepared.

The porous self-standing layer 310 is formed of particles of electrode material, often including mixed conductive carbon particles, and a partially dried or partially cured binder resin that serves to bond edges or partial surfaces of the particles to each other. The nature of the resin-bonding is such that the porous layer can be moved after forming, and applied as a soft, pliant unit 310 over the field of copper wires 306 upstanding from the surface 301 of the copper foil 300 in its surface-modified structure 308.

The prepared layer of electrode material 310 is then pressed onto the current collector foil 300 with its formed field of upstanding copper wires 306. The modified copper foil structure is indicated with the numeral 308. The soft, pliant, porous layer of electrode material 310 is pressed onto the outer ends of the copper wires 306 so as to leave one or more buffer spaces 315 between the layer of electrode material 310 and the surface 301 of the copper foil 300 at the bases of its integrally formed copper wires 306. If desired or necessary, further curing or drying of the resin-bonded layer may be accomplished after the layer 310 has been carefully applied to the copper foil structure 308. Thus, the overall structure of the formed electrode 312 comprises pores between the resin-bonded particles of electrode material and conductive carbon material. The binder resin is not employed in a quantity that depletes the pore space. And the resin-bonds between the particles and the upstanding copper wires 306 leaves spaces between them for a subsequently-introduced, infiltrating liquid electrolyte. Further, the buffer spaces 315 between the applied layer of electrode material 310 and the surface 301 of the copper foil 300 at the bases of the copper wires 306 also provide an opening or openings for infiltration with a liquid electrolyte solution in an assembled lithium cell.

Thus, the energy capacity of an anode or other electrode of a lithium cell may be increased by modifying the surface of a copper current collector foil by consuming a portion of the copper of the original fool and reshaping it as a field of integral, outwardly standing, copper wires on one or both surfaces of the original foil material. The field(s) of copper wires enables more electrode material to be bonded to the modified structural surface of the copper current collector. The copper wires further provide structures with increased surface areas for contact of a liquid electrolyte with both the particles and the wires to increase both the electrochemical performance of the cell and the flow of electrons in a DC current to and from the cell.

The scope of the following claims is not intended to be limited by the above illustrations of practices of the invention.

What is claimed is:

1. An electrode for a lithium electrochemical cell comprising:
   a copper foil current collector having opposing surfaces and a selected area of at least one of the opposing current collector surfaces being coated with a porous layer of resin-bonded particles of active electrode material;
   a coated area of the copper foil current collector surface being characterized by a field of upstanding copper wires integrally formed from copper material at the surface of the copper foil current collector with one end of each copper wire integrally attached to the remaining copper surface of the copper foil current collector, wherein the upstanding copper wires define different random angles with respect to the surface and each copper wire having a length in a range from 10 micrometers to 30 micrometers and a diameter in a range of 100 nanometers to 1 micrometer; and
   the porous layer of resin-bonded particles of active electrode material being formed on and within the field of upstanding copper wires and covering outer ends of the copper wires.

2. The electrode for a lithium electrochemical cell of claim 1 in which the active electrode material comprises at least one of graphite particles or lithium titanate particles.

3. The electrode for a lithium electrochemical cell of claim 1 in which the resin-bonded particles of the porous layer further comprise conductive carbon particles.

4. The electrode for a lithium electrochemical cell of claim 1 in which the porous layer has a thickness of greater than or equal to about 150 micrometers.

5. An electrode for a lithium electrochemical cell comprising:
   a current collector foil comprising copper and a plurality of integrally formed copper wires attached to a surface of the current collector foil, wherein the plurality of integrally formed copper wires define spaces therebetween and each copper wire of the plurality of integrally formed copper wires has a length in a range from 10 micrometers to 30 micrometers and a diameter in a range of 100 nanometers to 1 micrometer;
   a porous electrode material comprising particles of active electrode material and a resin disposed in at least a portion of the spaces defined by the plurality of integrally formed copper wires and in which the porous electrode material covers terminal ends of the plurality of integrally formed copper wires, and a buffer space disposed between the porous electrode material and the surface of the current collector foil.

6. The electrode for a lithium electrochemical cell of claim 5 in which the active electrode material comprises at least one of graphite particles or lithium titanate particles.

7. The electrode for a lithium electrochemical cell of claim 5 in which the porous electrode material further comprises conductive carbon particles.

8. The electrode for a lithium electrochemical cell of claim 5 in which the porous electrode material has a thickness of greater than or equal to about 150 micrometers.

9. The electrode for a lithium electrochemical cell of claim 5 further comprising an electrolyte distributed in pores of the porous electrode material and in the buffer space.

10. The electrode for a lithium electrochemical cell of claim 5, wherein the plurality of integrally formed copper wires define different angles with respect to the surface of the current collector foil.

11. The electrode for a lithium electrochemical cell of claim 10 in which the different angles are random.

12. An electrode for a lithium electrochemical cell comprising:
    a copper foil current collector having opposing surfaces and a selected area of at least one of the opposing current collector surfaces being coated with a porous layer of resin-bonded particles of active electrode material;
    a coated area of the copper foil current collector surface being characterized by a field of upstanding copper wires integrally formed from copper material at the surface of the copper foil current collector with one end of each copper wire integrally attached to the remaining copper surface of the copper foil current collector, wherein the upstanding copper wires define different angles with respect to the surface and each copper wire having a length in a range from 10 micrometers to 30 micrometers and a diameter in a range of 100 nanometers to 1 micrometer; and
    the porous layer of resin-bonded particles of active electrode material being formed on and within the field of upstanding copper wires and covering outer ends of the copper wires, in which the porous layer of resin-bonded particles of active electrode material has been applied to the field of upstanding copper wires so as to leave a space between at least a portion of the porous layer and the remaining copper surface of the copper foil current collector.

13. The electrode for a lithium electrochemical cell of claim 12 in which the active electrode material comprises at least one of graphite particles or lithium titanate particles.

14. The electrode for a lithium electrochemical cell of claim 12 in which the resin-bonded particles of the porous layer further comprise conductive carbon particles.

15. The electrode for a lithium electrochemical cell of claim 12 in which the porous layer has a thickness of greater than or equal to about 150 micrometers.

\* \* \* \* \*